United States Patent
Bosco, Jr.

(10) Patent No.: US 8,474,297 B1
(45) Date of Patent: Jul. 2, 2013

(54) METHOD OF FORMING A LAMINATED ABUTMENT CLIP

(75) Inventor: Robert Bosco, Jr., Wolcott, CT (US)

(73) Assignee: Anstro Manufacturing, Inc., Wolcott, CT (US)

( * ) Notice: Subject to any disclaimer, the term of this patent is extended or adjusted under 35 U.S.C. 154(b) by 316 days.

(21) Appl. No.: 12/826,957

(22) Filed: Jun. 30, 2010

(51) Int. Cl.
*B21D 31/00* (2006.01)

(52) U.S. Cl.
USPC .......... 72/379.2; 72/404; 72/405.1; 72/379.6; 72/363

(58) Field of Classification Search
USPC .................. 72/404, 405.1, 379.2, 379.6, 381, 72/386, 363
See application file for complete search history.

(56) References Cited

U.S. PATENT DOCUMENTS

| | | | | |
|---|---|---|---|---|
| 3,866,471 A * | 2/1975 | Carroll et al. | ................... | 72/337 |
| 5,012,664 A * | 5/1991 | Hembree | ........................ | 72/404 |
| 5,016,461 A * | 5/1991 | Walker et al. | ................... | 72/336 |
| 5,099,967 A * | 3/1992 | Lang | ............................. | 188/328 |
| 5,354,522 A * | 10/1994 | Baartman | ..................... | 264/479 |
| 5,755,023 A * | 5/1998 | Neuenschwander | ............ | 29/596 |
| 5,915,296 A * | 6/1999 | Itakura | ........................... | 100/209 |
| 5,927,920 A * | 7/1999 | Swanstrom | ................... | 411/180 |
| 6,006,563 A * | 12/1999 | Zhang et al. | ................... | 72/17.3 |
| 6,067,834 A * | 5/2000 | Stone | ............................ | 72/337 |
| 6,418,611 B1 * | 7/2002 | Weber et al. | ................. | 29/564.6 |
| 6,499,569 B1 * | 12/2002 | Beggs et al. | ............... | 188/73.37 |
| 6,691,547 B2 * | 2/2004 | Cutshall et al. | ................. | 72/404 |
| 6,742,239 B2 * | 6/2004 | Lee et al. | ......................... | 29/596 |
| 7,032,426 B2 * | 4/2006 | Durney et al. | ................... | 72/324 |
| 7,152,449 B2 * | 12/2006 | Durney et al. | ................... | 72/324 |
| 7,309,248 B2 * | 12/2007 | Sakamoto | ...................... | 439/326 |
| 2002/0148273 A1 * | 10/2002 | McKinney et al. | ........... | 72/379.2 |
| 2005/0016249 A1 * | 1/2005 | Bender | ........................... | 72/404 |
| 2007/0062758 A1 * | 3/2007 | Jensen et al. | .................. | 181/290 |

* cited by examiner

*Primary Examiner* — Dana Ross
*Assistant Examiner* — Onekki Jolly
(74) *Attorney, Agent, or Firm* — Carmody & Torrance LLP

(57) ABSTRACT

A method of forming a stamped metal laminate part from a strip stock with a layer of viscoelastic material laminated between two metal layers, and a laminated abutment clip made by the method. Part carriers are disposed on the sides of the stock. A longitudinal axis extends between the part carriers through the stock. The stock is advanced through a progressive die to a first position where a first form is created, a second position, where a second form is created by modifying the first form, and to a third position where a third form is created. Relative sliding of the metal layers in the stock is prevented between the axis and the form being created, and relative sliding of the metal layers is permitted at a section beyond the particular form being created, preventing delamination of the stock while the first, second and third forms are formed.

17 Claims, 11 Drawing Sheets

Beginning of forming cycle

Forming cycle completed

Forming cycle completed

METHOD OF FORMING A LAMINATED ABUTMENT CLIP

FIELD OF THE INVENTION

The present invention relates generally to a method of forming stamped metal laminate parts into abutment clips, preferably for automobile brake assemblies.

BACKGROUND OF THE INVENTION

Progressive die drawing or stamping is a forming process that utilizes a series of stamping stations to perform simultaneous operations on sheet metal. The final metal workpiece is developed as the strip of metal is processed through the stamping die.

Progressive die stamping process characteristics include:

1) The utilization of multiple cutting and/or forming operations simultaneously;

2) Suitability to produce small workpieces at a rapid rate;

3) The ability to save time and money by combining forming operations; and

4) The capability to maintain close tolerances, depending on the tools.

As the metal strip is moved through the stamping process, it is exposed to a series of progressive die stations, each one changing the metal configuration left on the metal by the previous station. Thus, the metal workpiece is created in a series of stamping stages.

During the stamping operation, punches in the die can perform cutting, forming, and drawing operations to produce the needed component.

Common materials that can be progressively drawn include aluminum, brass, cold rolled commercial steel, cold rolled draw steel and cold rolled stainless steel.

In addition to these materials, laminates of these materials, including for example, laminates of stainless steel and rubber can also be progressively bent and/or formed.

The inventors of the present invention have surprisingly discovered that the order in which the stamping stations are arranged in a progressive die system that processes laminates is a key factor in producing a stamped part in which bending/flexing or delamination of linear sections of the stamped laminated parts can be substantially eliminated.

The present invention can be used, for example, to prepare abutment clips comprising a sound dampening material laminated between two metal layers that are then preferably used to isolate a brake pad from the remainder of the brake system. The abutment clip may be held in place, for example, by a spring mechanism or interference fit that is incorporated into the clip itself.

SUMMARY AND OBJECTIVES OF THE INVENTION

It is an object of the present invention to provide an improved method of preparing stamped and formed parts from a strip stock using a progressive die.

It is another object of the present invention to provide a method of preparing stamped and formed parts from a laminated strip stock comprising a viscoelastic layer sandwiched between two metal layers.

It is still another object of the present invention to prevent bending/flexing or delamination of linear sections of the stamped laminate during the forming process.

It is still another object of the present invention to effectively secure the metal layers of the laminate in place and prevent delamination during the various stamping steps.

Further objects and advantages of the invention will become more apparent from a consideration of the drawings and ensuing description.

The invention accordingly comprises the features of construction, combination of elements, arrangement of parts and sequence of steps that will be exemplified in the disclosure hereinafter set forth, and the scope of the invention will be indicated in the claims.

To that end, the present invention relates generally to a method of forming a stamped metal laminate part. For example, in a preferred embodiment of the present invention, the method of forming a stamped metal laminate part from a strip stock, wherein a part carrier is provided on each side of the strip stock, wherein a longitudinal axis can be defined between the two part carriers and through the strip stock, wherein the strip stock comprises a layer of viscoelastic material laminated between two metal layers, comprises the steps of advancing the strip stock through a progressive die to a first position at which a first form is created in the strip stock at a first location spaced from the longitudinal axis; advancing the strip stock through the progressive die to a second position at which a second form is created in the strip stock by modifying the first form; and advancing the strip stock through the progressive die to at least a third position at which a third form is created in the strip stock, wherein the second form is intermediate the longitudinal axis and the third form; wherein the successive creation of the first form, second form and then the third form (i) prevents the relative sliding of the metal layers in the strip stock between the longitudinal axis and the particular form being created during the formation of the successive forms, and (ii) permits the relative sliding of the metal layers in the strip stock at a section thereof beyond the particular form being created, thereby preventing delamination of the strip stock during the forming of the first, second and third forms.

In another preferred embodiment of the present invention, the method is directed to the forming a stamped metal laminate part from a strip stock having a generally C-shape, wherein a part carrier is provided on each side of the C-shape strip stock, wherein a longitudinal axis can be defined between the two part carriers and through the C-shape strip stock, wherein the strip stock comprises a layer of viscoelastic material laminated between two metal layers, and wherein the method comprises the steps of advancing the strip stock through a progressive die to a first position at which a first form is created in the strip stock at a first location spaced from the longitudinal axis; thereafter, advancing the strip stock through the progressive die to a second position at which a second form is created in the strip stock by modifying the first form; and thereafter, advancing the strip stock through the progressive die to at least a third position at which a third form is created in the strip stock, wherein the second form is intermediate the longitudinal axis and the third form; wherein the successive creation of the first form, second form and then the third form (i) prevents the relative sliding of the metal layers in the strip stock between the longitudinal axis and the particular form being created during the formation of the successive forms, and (ii) permits the relative sliding of the metal layers in the strip stock at a section thereof beyond the particular form being created, thereby preventing delamination of the strip stock during the forming of the first, second and third forms.

The present invention is also directed to laminated abutment clips made by one or more methods disclosed herein.

BRIEF DESCRIPTION OF THE DRAWINGS

For a fuller understanding of the invention, reference is had to the following description taken in connection with the accompanying figures, in which.

Also, while not all elements are labeled in each figure, all elements with the same reference number indicate similar or identical parts.

DETAILED DESCRIPTION OF THE PREFERRED EMBODIMENTS

Figure 1A:
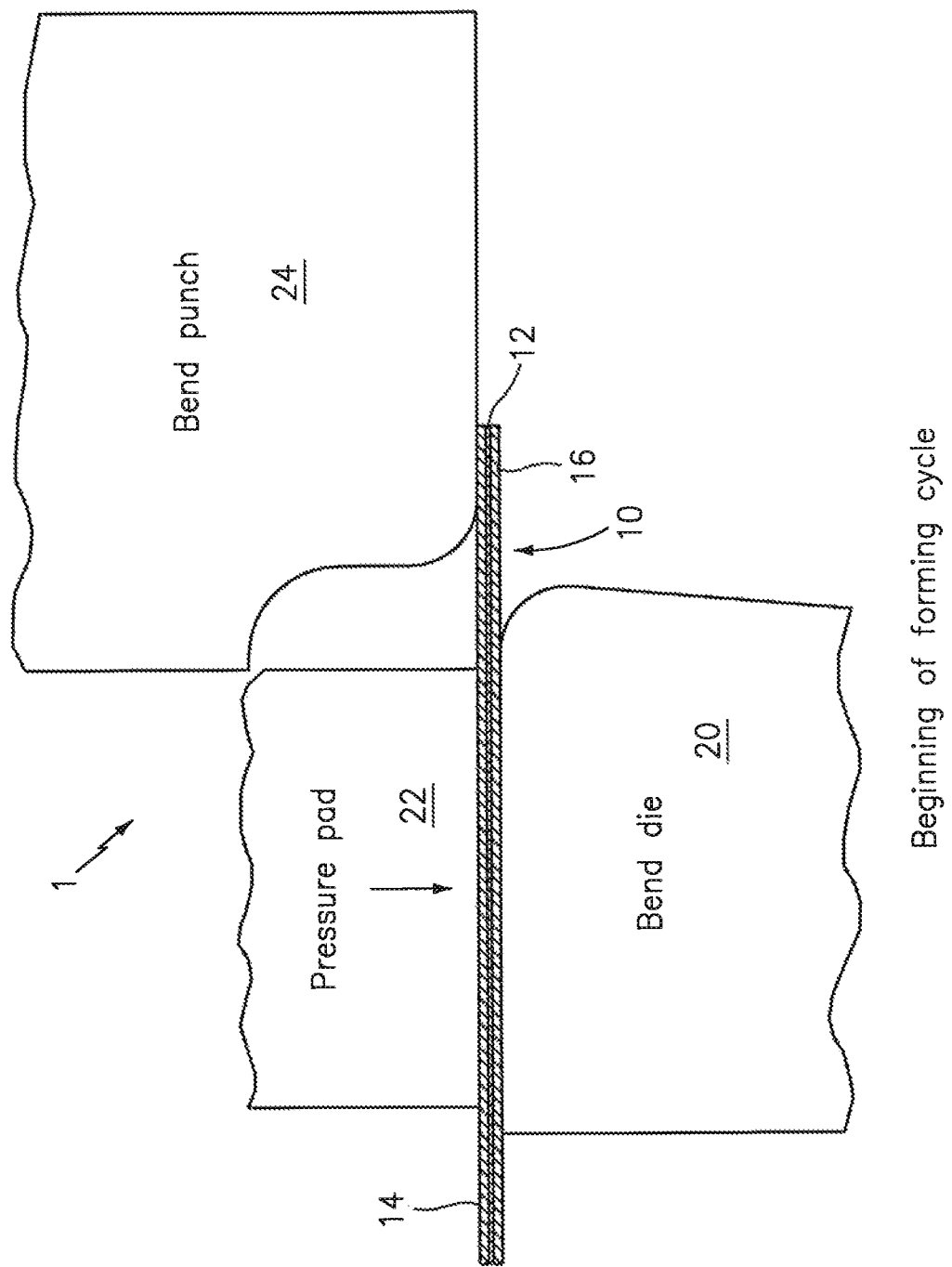
FIG. 1A depicts the beginning of a generic forming cycle of a laminated strip stock in accordance with a preferred embodiment of the present invention.

The present invention relates generally to a method of forming stamped metal laminate parts. For example, in a preferred embodiment of the present invention, a method of forming a stamped metal laminate part from a strip stock is provided. In such an embodiment, a part carrier is preferably provided on each side of the strip stock, wherein a longitudinal axis can be defined between the two part carriers and through the strip stock, wherein the strip stock comprises a layer of viscoelastic material laminated between two metal layers, and the method comprises the steps of advancing the strip stock through a progressive die to a first position at which a first form is created in the strip stock at a first location spaced from the longitudinal axis; advancing the strip stock through the progressive die to a second position at which a second form is created in the strip stock by modifying the first form; and advancing the strip stock through the progressive die to at least a third position at which a third form is created in the strip stock, wherein the second form is intermediate the longitudinal axis and the third form; wherein the successive creation of the first form, second form and then the third form:

prevents the relative sliding of the metal layers in the strip stock between the longitudinal axis and the particular form being created during the formation of the successive forms, and permits the relative sliding of the metal layers in the strip stock at a section thereof beyond the particular form being created, thereby preventing delamination of the strip stock during the forming of the first, second and third forms. Preferably, the advancing steps are done in the particular successive order set forth above.

In another preferred embodiment, a method of forming a stamped metal laminate part from a strip stock having a generally C-shape, wherein a part carrier is provided on each side of the C-shape strip stock, wherein a longitudinal axis can be defined between the two part carriers and through the C-shape strip stock, wherein the strip stock comprises a layer of viscoelastic material laminated between two metal layers, comprises the steps of advancing the strip stock through a progressive die to a first position at which a first form is created in the strip stock at a first location spaced from the longitudinal axis; thereafter, advancing the strip stock through the progressive die to a second position at which a second form is created in the strip stock by modifying the first form; and thereafter, advancing the strip stock through the progressive die to at least a third position at which a third form is created in the strip stock, wherein the second form is intermediate the longitudinal axis and the third form; wherein the successive creation of the first form, second form and then the third form:

prevents the relative sliding of the metal layers in the strip stock between the longitudinal axis and the particular form being created during the formation of the successive forms, and permits the relative sliding of the metal layers in the strip stock at a section thereof beyond the particular form being created, thereby preventing delamination of the strip stock during the forming of the first, second and third forms.

One or more laminated abutment clips made by the one or more methods disclosed herein is also provided.

The metal layers may be selected from the group consisting of aluminum, steel and combinations of one or more of the foregoing. Other metal layers, metal alloy layers and combinations thereof would also be usable in the practice of the present invention so long as such materials are capable of being deformed in the progressive die. In one embodiment, the metal layers comprise stainless steel and the layers of stainless steel may have a thickness of about 0.15 mm to about 0.5 mm.

The viscoelastic layer preferably comprises natural or synthetic rubber. Synthetic rubbers usable in the process of the invention include chloroprene rubber, ethylene propylene rubber, butyl rubber, hypalon rubber nitrile rubber and styrene butadiene rubber by way of example and not limitation. In a preferred embodiment, the viscoelastic layer comprises nitrile rubber and has a thickness of between about 0.05 mm to about 0.1 mm.

Figure 1B:
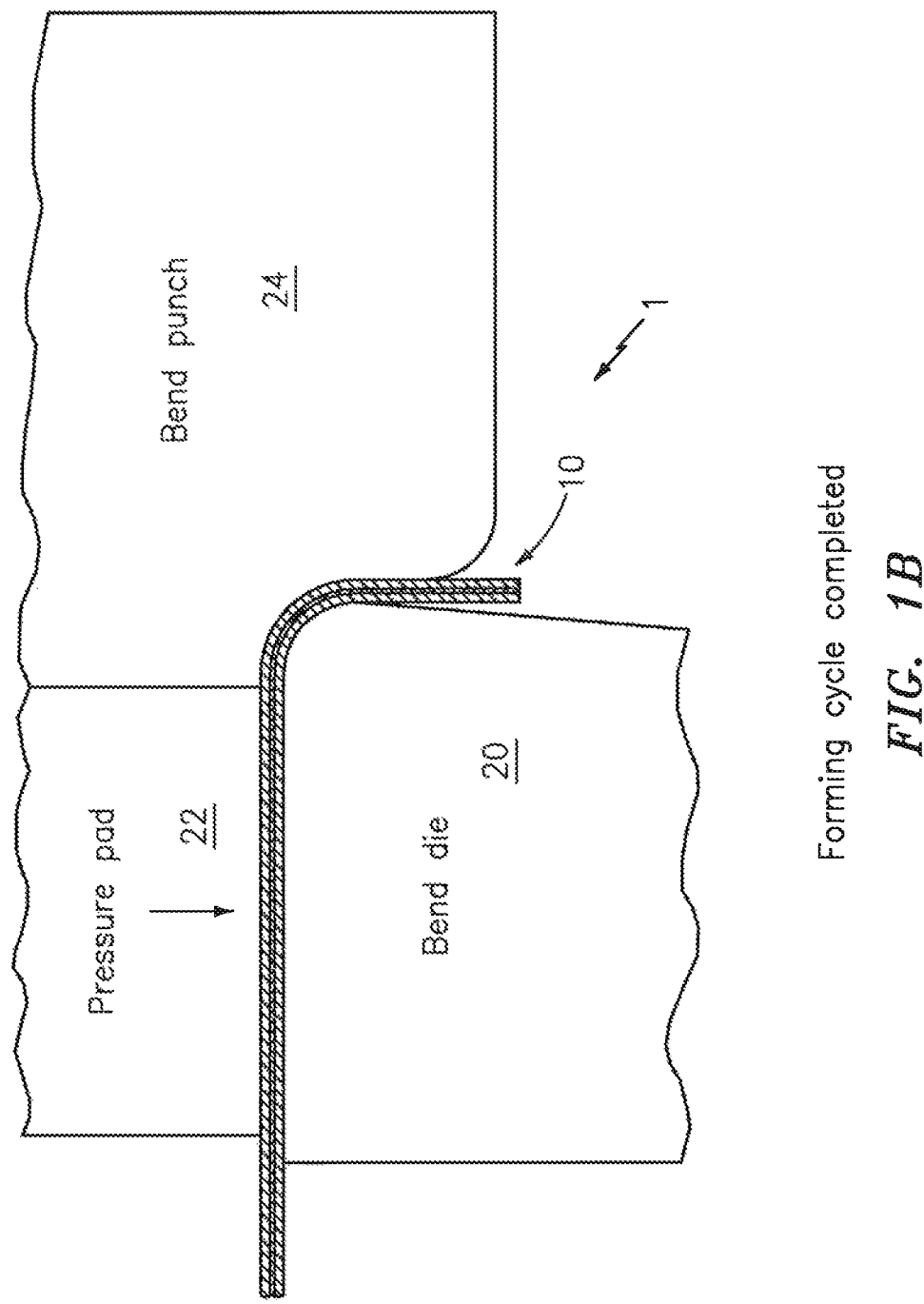
FIG. 1B depicts the competed form cycle of a generic forming cycle in accordance with a preferred embodiment of the present invention.

Turning now to the figures in connection with the following disclosure, FIG. 1A depicts the beginning of a typical forming cycle in which strip stock 10 comprising a layer of viscoelastic material 12 laminated between two metal layers 14 and 16 are fed through a progressive die 1 having a bend die 20 on one side of the strip stock 10 and a pressure pad 22 and bend punch 24 on an opposite side of the strip stock 10. As the strip stock 10 moves through the progressive die 1, the bend punch 24 and pressure pad 22 create a bend in the strip stock 10 corresponding to bend die 20, as can be seen in FIG. 1B.

Figure 2A:
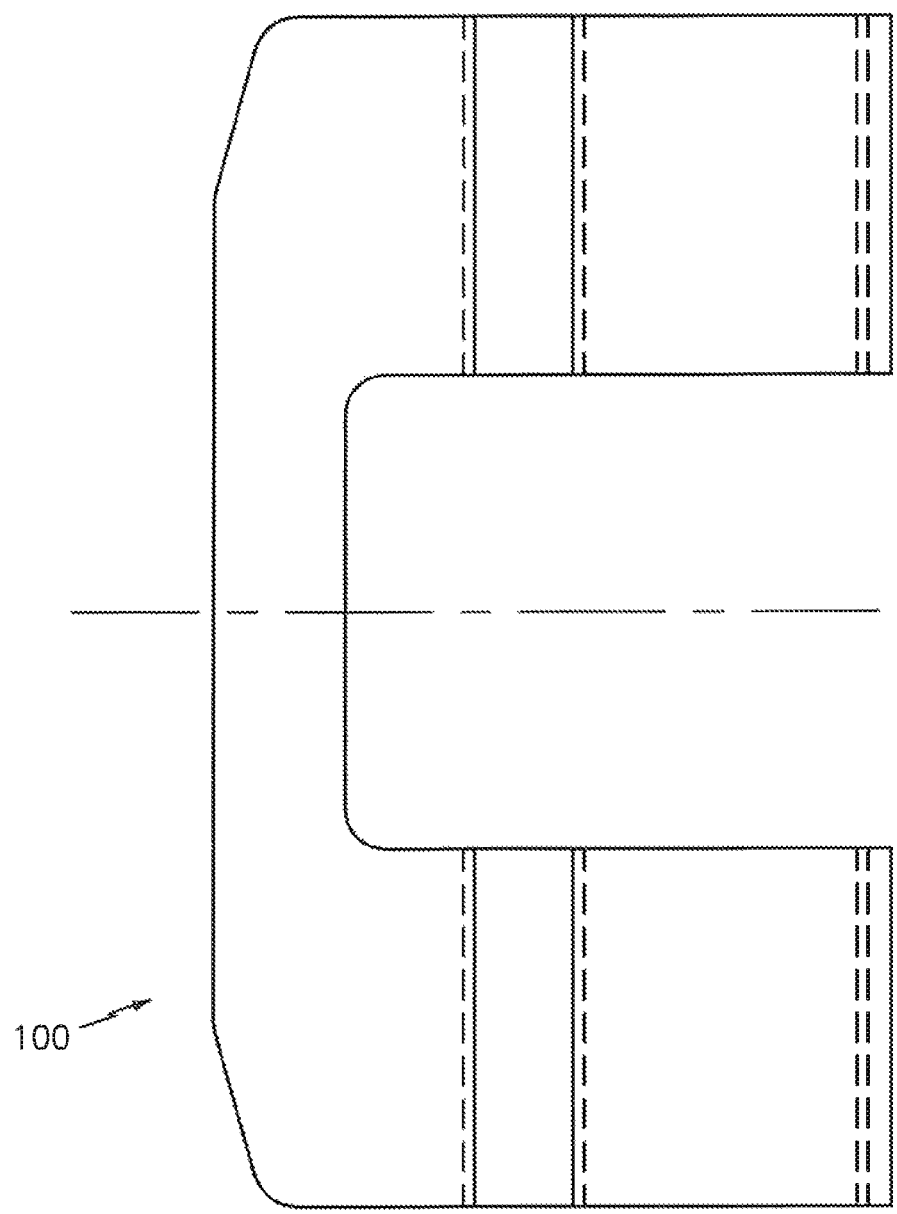
FIG. 2A depicts a top view of a laminated abutment clip made in accordance with a preferred embodiment of the present invention and FIG. 2B depicts a side view of the laminated abutment clip in FIG. 2A.
Figure 2B:
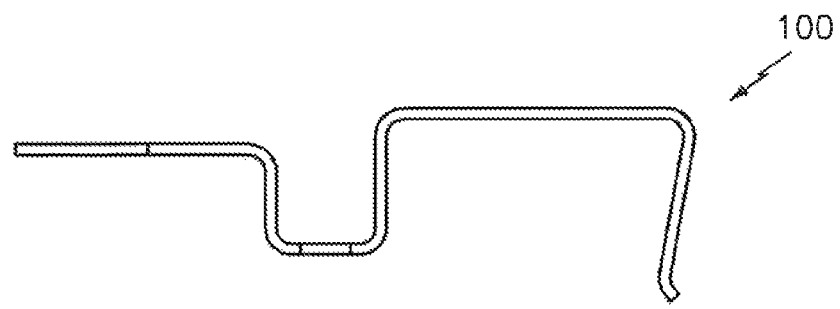

FIGS. 2A and 2B depict top and side views, respectively, of a laminated abutment clip 100 formed in accordance with a preferred embodiment of the present invention.

Figure 3A:
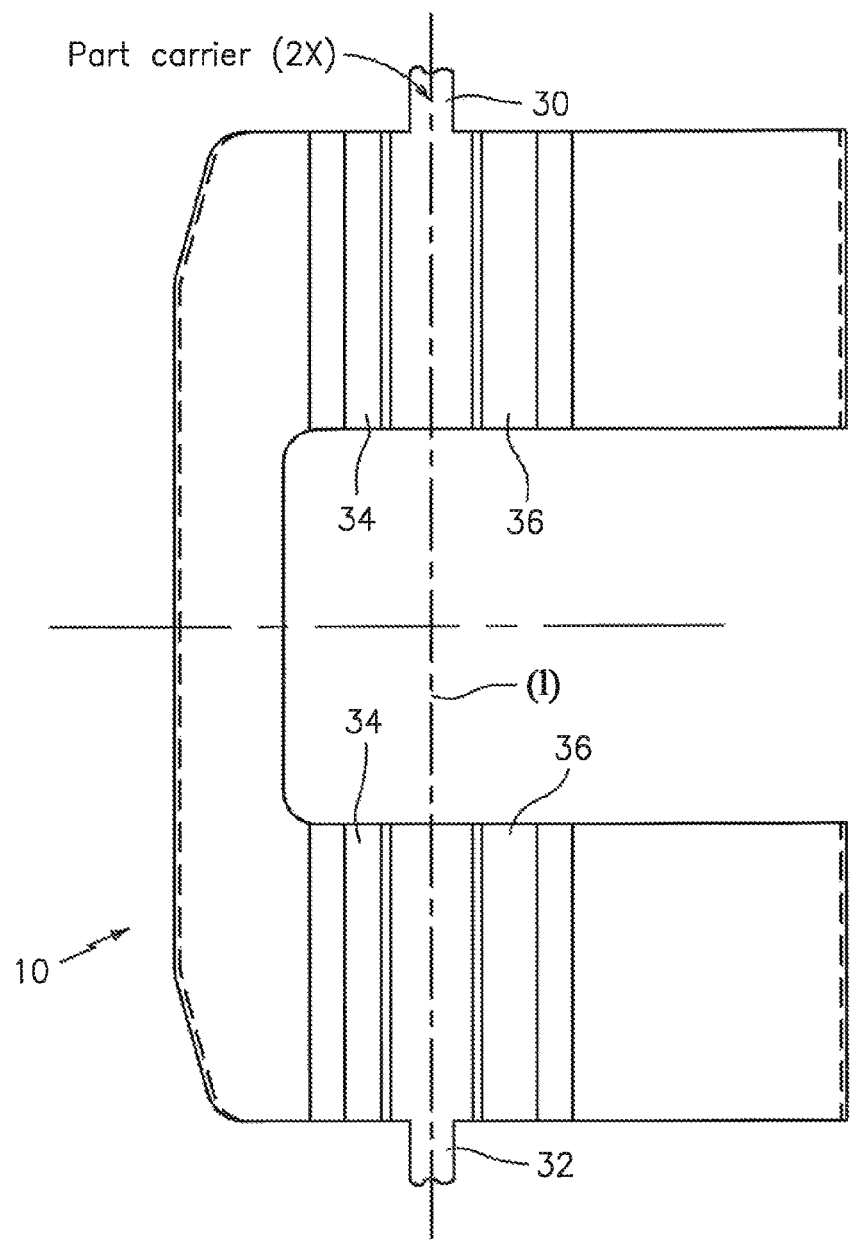
FIG. 3A depicts a top view of the laminated strip stock after having a first form provided in accordance with a preferred embodiment of the present invention and FIG. 3B depicts a side view of the laminated strip stock in FIG. 3A.
Figure 3B:
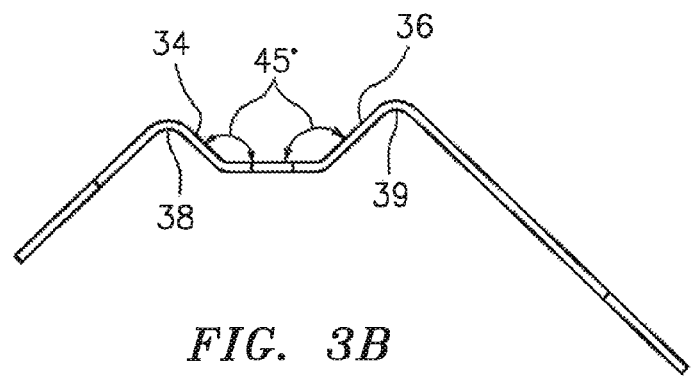

FIGS. 3A and 3B illustrate the created first forms in the strip stock at at least a first location spaced from the longitudinal axis. For example, a first form is created by a first bend 34 of at least substantially 45' relative to the unbended surface of part carriers 30, 32. As illustrated, the first bend 34 is on a first (e.g. left) side of the longitudinal axis (1). As also depicted in FIGS. 3A, 3B, the first form preferably further comprises creating a second first bend 36 of at least substantially 45° relative to the unbended surface of the part carriers, wherein the first bend is on a side opposite (e.g. right side) of the first side of the part carriers 30, 32.

Figure 4A:
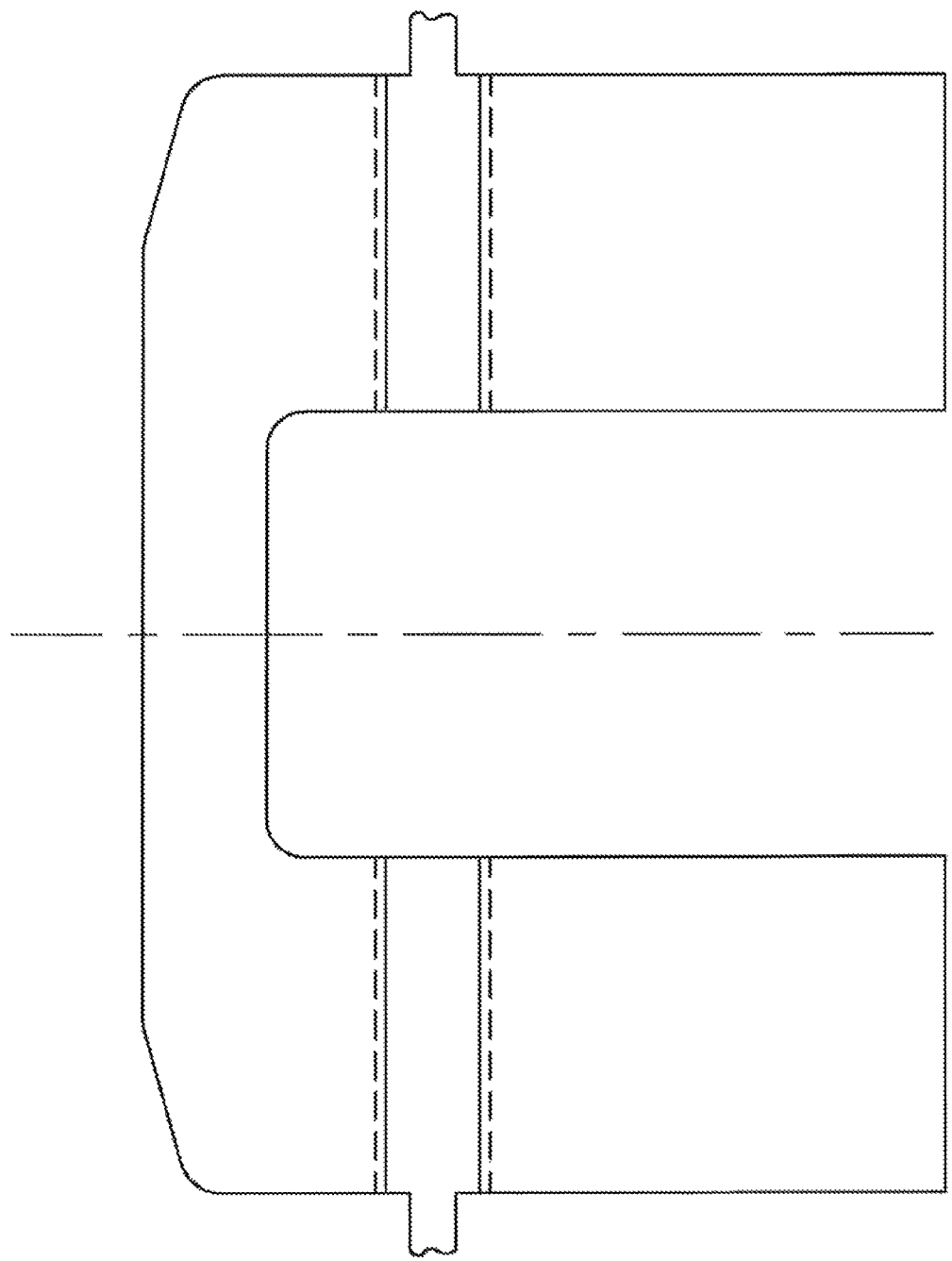
FIG. 4A depicts a top view of the laminated strip stock after having a second form provided in accordance with a preferred embodiment of the present invention and FIG. 4B depicts a side view of the laminated strip stock in FIG. 4A.
Figure 4B:
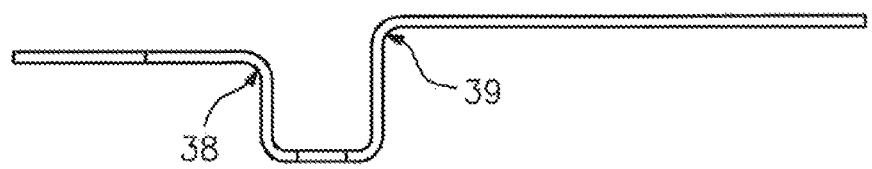

In accordance with a preferred method and with reference to FIGS. 4A, 4B, the strip stock is then advanced through the progressive die to a second position at which a second form is created. Preferably, this second form is a modification of the first form. In a specifically preferred method, the second form is substantially a U-shape form in the strip stock. That is, the substantially U-shape in the strip stock is formed by modifying each of the first bends 34, 36.

It can also be seen that additional bends 38, 39 are preferably formed during the forming process. These bends 38, 39 are likewise seen in at least FIGS. 3A, 3B, 4A, 4B.

Figure 5A:
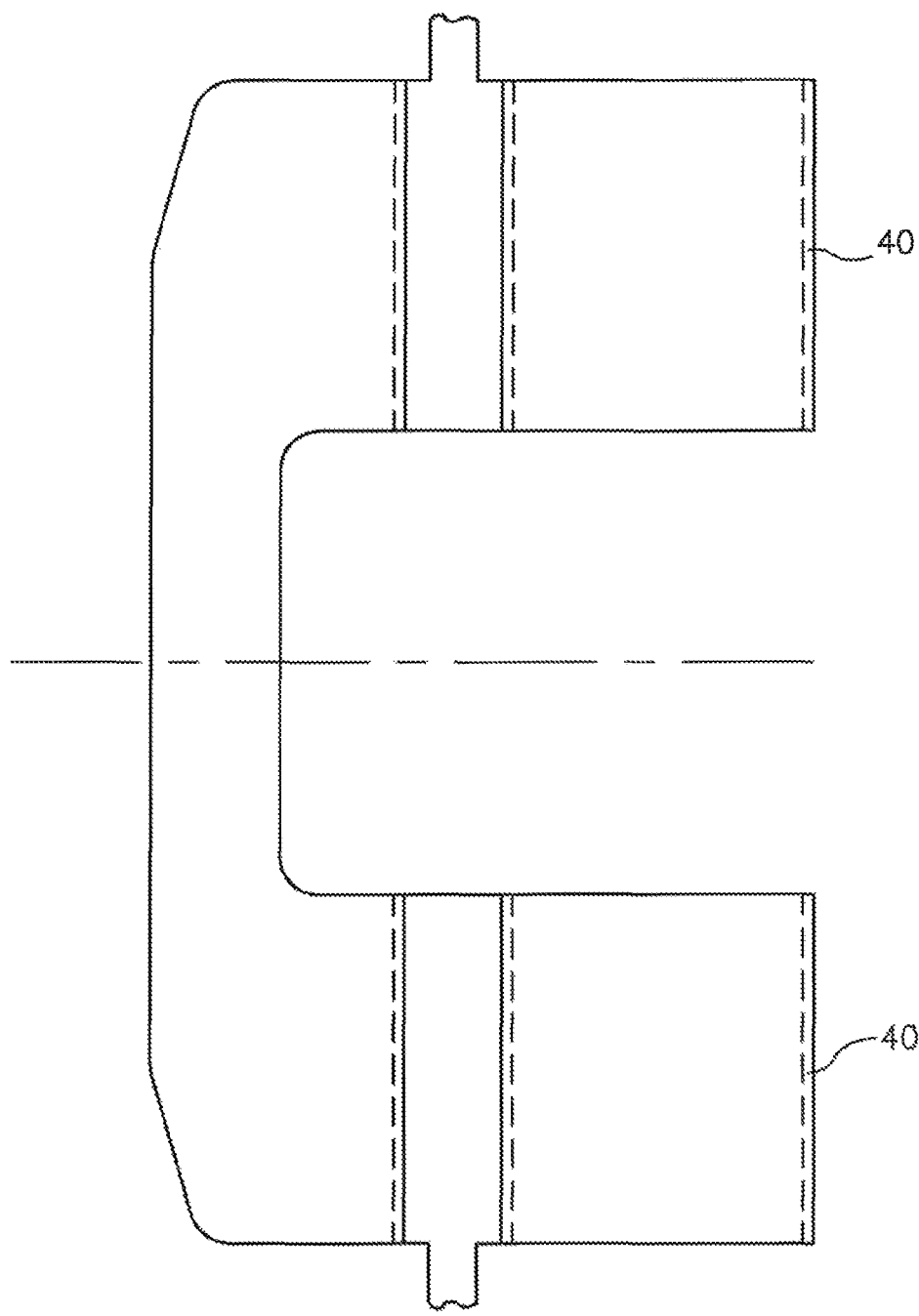
FIG. 5A depicts a top view of the laminated strip stock after having a third form provided in accordance with a preferred embodiment of the present invention and FIG. 5B depicts a side view of the laminated strip stock in FIG. 5A.
Figure 5B:
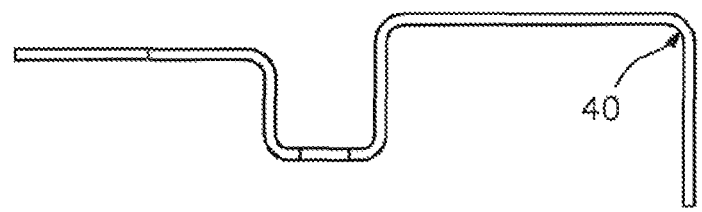

The preferred method continues by advancing the strip stock through the progressive die to at least a third position at which a third form is created in the strip stock, wherein the second form is intermediate the longitudinal axis and the third form. In this preferred embodiment, this step comprises forming substantially an L-shape form in the strip stock. This L-shape is noted in FIGS. 5A, 5B with the reference numeral 40 at the third location spaced from the longitudinal axis (1).

Figure 6A:
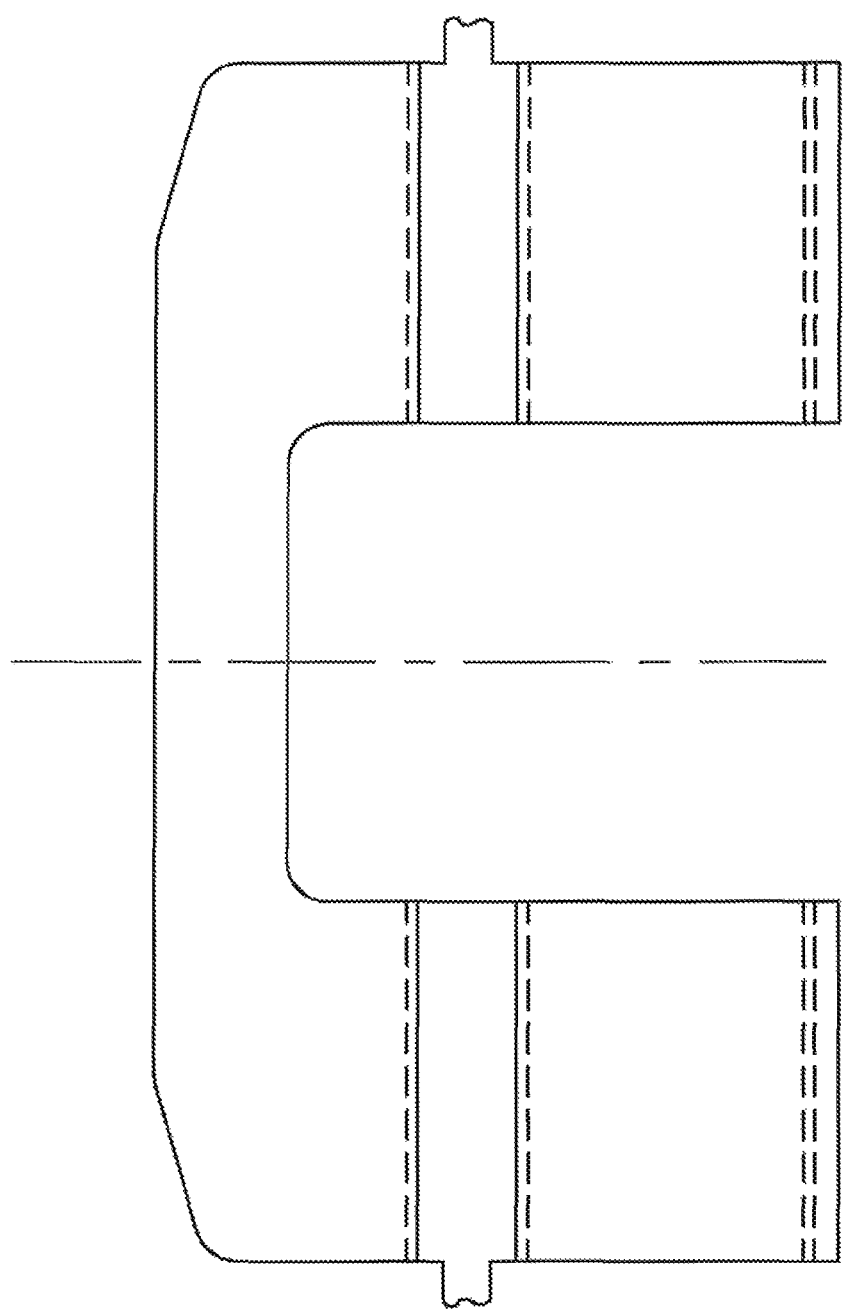
FIG. 6A depicts a top view of the laminated strip stock after having a fourth form provided in accordance with a preferred embodiment of the present invention and FIG. 6B depicts a side view of the laminated strip stock in FIG. 6A.
Figure 6B:
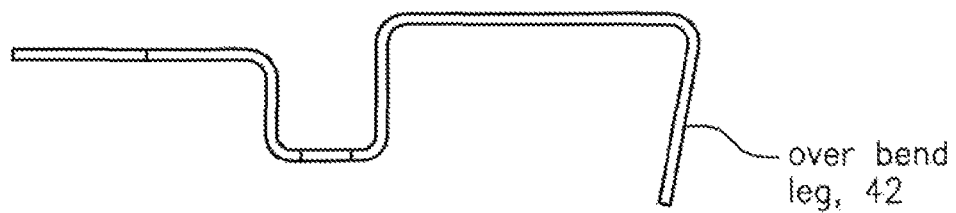
Figure 7A:
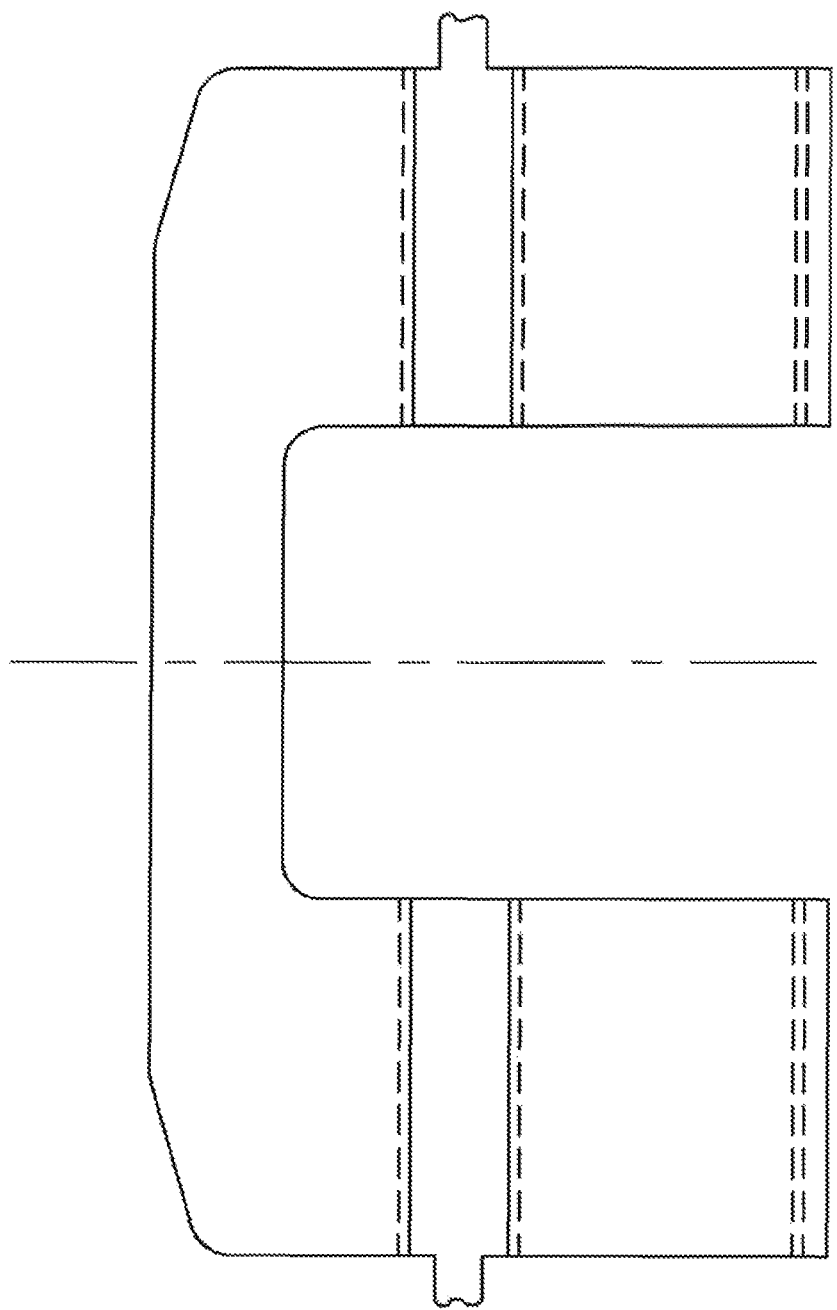
FIG. 7A depicts a top view of the laminated strip stock after having a fifth form provided in accordance with a preferred embodiment of the present invention and FIG. 7B depicts a side view of the laminated strip stock in FIG. 7A.
Figure 7B:
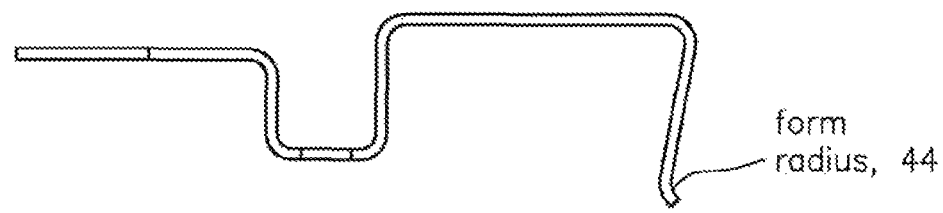
Figure 8:
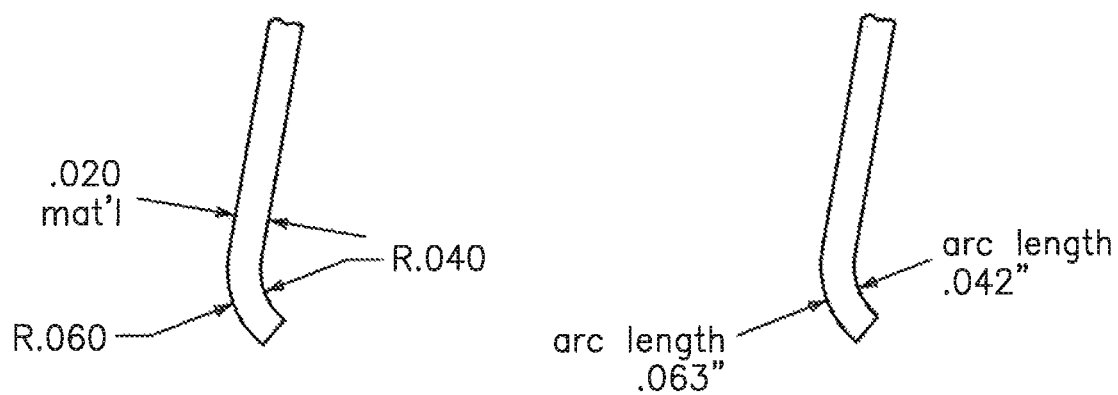
FIG. 8 depicts a view of the fifth form in which a radius is formed.

Thereafter and with reference to FIGS. 6A, 6B, a preferred embodiment of the present invention provides the step of advancing the strip stock to a fourth position where an overbend 42 in the L-shape is created. The preferred method also may include yet an additional step of advancing the strip stock to a fifth position, where a radius bend 44 at a distal end of the L-shape is created, as illustrated in FIGS. 7A, 7B. Details of the preferred radius bend of FIGS. 7A, 7B are illustrated in FIGS. 8A, 8B.

As would be known in the art, strip stock 10 may be advanced through the progressive die to additional positions to create additional forms in the strip stock 10.

Figure 10A:
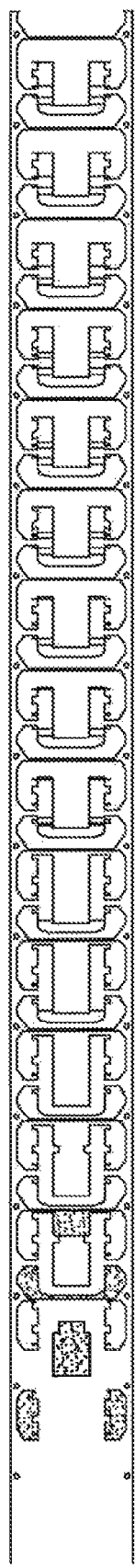
FIGS. 10A and 10B depicts an exemplary completed progressive die strip, top and side views respectively, in accordance with the present invention.
Figure 10B:

As indicated herein, in a preferred embodiment, the strip stock may comprise a general C-shape as shown generally in the figures, however this is by example and not limitation. Part carriers 30, 32 are preferably positioned at the "bottom of the C" and at the "top of the C" as illustrated. Also, as would be understood in the art, it is preferable that as the forms are being created in the "lower" portion of the "C-shape" the corresponding forms are simultaneously being formed in the "upper" portion of the "C-shape." It should be understood that references to "top," "bottom," "lower" and "upper" are merely being made for convenience of discussion and not limitation. Preferably, part carriers 30, 32 are integrally formed with the strip stock prior to removal. FIGS. 10A, 10B illustrate a completed progressive die strip layout in accordance with the present invention. It will also be understood that as the strip stock moves relative to the assembly, subsequent die shapes are encountered to make the appropriate forms, as illustrated in the figures.

Figure 11A:
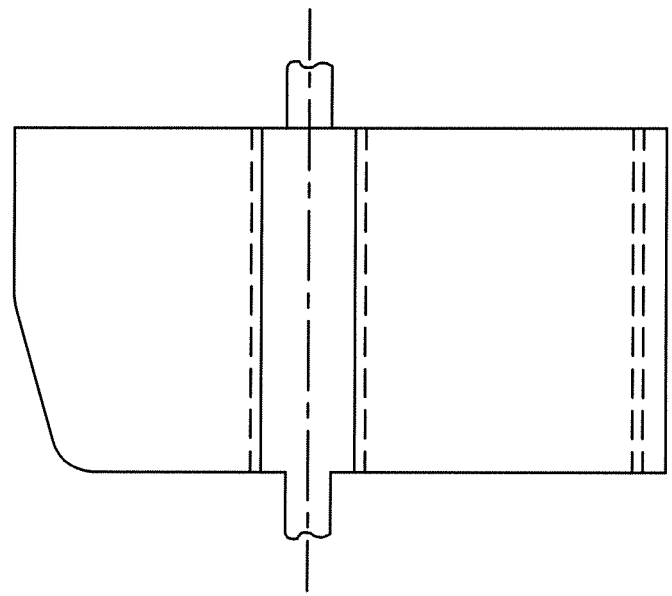
FIGS. 11A, 11B are respective top and side views of a laminated abutment clip made in accordance with another preferred embodiment of the present invention, more particularly illustrating a differently shaped strip stock than the C-shape illustrated in FIGS. 2A, 2B et seq.
Figure 11B:
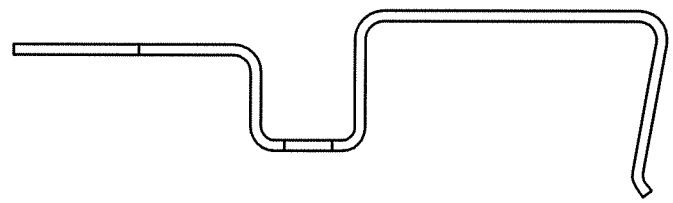

That is, in accordance with the present invention, the preferred method may also comprise the steps of separating the C-shape or otherwise, stamped metal laminate part from the first and second part carriers 30, 32 by advancing the strip stock through the progressive die and punching the stamped metal laminate part from the first and second part carriers 30, 32. To be sure, FIGS. 11A, 11B illustrate a somewhat rectangular piece of strip stock, which can be used with and in accordance with the methodologies herein. Therefore, the foregoing disclosure and methodologies are equally applicable to the strip stock of FIGS. 11A, 11B.

Figure 9:
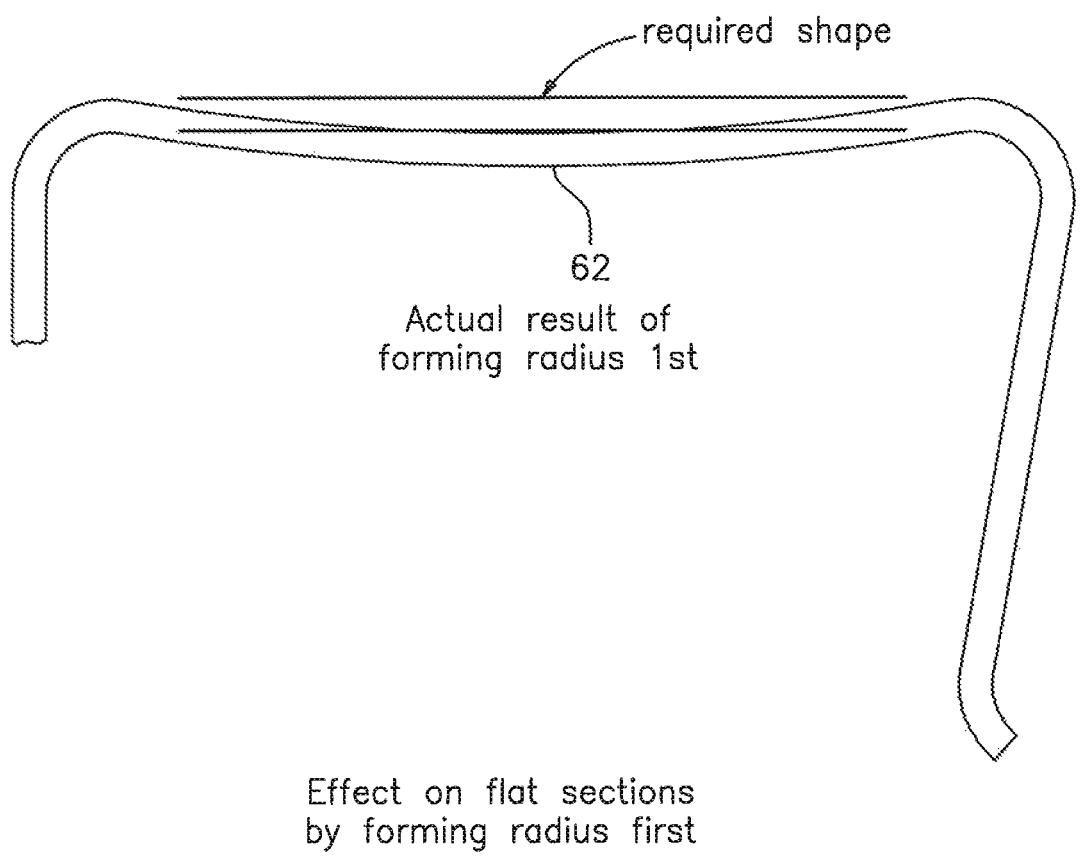
FIG. 9 depicts exemplary effects on linear sections of the laminated strip stock when processed in accordance with (and not in accordance with) the present invention.

FIG. 9 depicts both the effect on linear sections of the strip stock when processed in accordance with the present invention and when not processed in accordance with the present invention. For example, when the process steps are performed in a different order than described herein, the linear section at 62 may bend or flex, which can cause delamination of the laminate. On the other hand, when the processing step are performed in the mariner described and claimed herein, the successive creation of the first form, second form and then the third form prevents the relative sliding of the metal layers in the strip stock between the longitudinal axis and the particular form being created during the formation of the successive forms, and permits the relative sliding of the metal layers in the strip stock at a section thereof beyond the particular form being created, thereby preventing delamination of the strip stock during the forming of the first, second and third forms.

As can thus be seen, one or more laminated abutment clips, such as for automotive brake assemblies, by way of example and not limitation, can be made by the methods as set forth above.

While the present invention is described herein for forming one or more laminated abutment clips for use in automotive braking assemblies, it can be seen that the method of forming a stamped metal laminate part can also be used for producing other metal laminate parts in which there is a concern for bending or delamination of linear sections of the metal laminate parts. Thus, it is readily apparent to one skilled in the art that the actual number of forming steps may vary for example, depending upon the specific material chosen, the combination of materials that makes up the laminate, the thickness of the laminated material and the design of the stamping tool. However, what must remain constant is the ordering of form creations as set forth above.

The laminated abutment clips typically comprise a rubber layer sandwiched between two steel layers and which can withstand the forces applied during braking.

Finally, while the invention has been particularly shown and described with respect to preferred embodiments thereof; it will be understood that changes in form and details may be made therein without departing from the scope and spirit of the invention. For example, other shapes, other than a C-shape for the strip stock, are contemplated herein. Similarly, other bends so as to be usable in other braking assemblies are also contemplated herein. Again, what is important is the order of steps as provided for above and in the claims.

What is claimed is:

1. A method of forming a stamped metal laminate part from a strip stock, wherein a part carrier is provided on each side of the strip stock, wherein a longitudinal axis can be defined between the two part carriers and through the strip stock, wherein the strip stock comprises a layer of viscoelastic material laminated between two metal layers, the method comprising the steps of:

advancing the strip stock through a progressive die to a first position at which a first form is created in the strip stock at a first location spaced from the longitudinal axis;

advancing the strip stock through the progressive die to a second position at which a second form is created in the strip stock by modifying the first form; and advancing the strip stock through the progressive die to at least a third position at which a third form is created in the strip stock, wherein the second form is intermediate the longitudinal axis and the third form;

wherein the successive creation of the first form, second form and then the third form:

prevents the relative sliding of the metal layers in the strip stock between the longitudinal axis and the particular form being created during the formation of the successive forms, and permits the relative sliding of the metal layers in the strip stock at portions thereof further from the longitudinal axis than the particular form being created, thereby preventing delamination of the strip stock during the forming of the first, second and third forms.

2. The method according to claim 1, wherein the metal layers are selected from the group consisting of aluminum, steel and combinations of one or more of the foregoing.

3. The method according to claim 2, wherein the metal layers comprise stainless steel.

4. The method according to claim 1, wherein the viscoelastic layer comprises natural or synthetic rubber.

5. The method according to claim 1, wherein the first form comprises creating a first bend of at least substantially 45° relative to the unbended surface of the part carriers, wherein the first bend is on a first side of the longitudinal axis.

6. The method according to claim 5, wherein the first form further comprises creating a second first bend of at least substantially 45° relative to the unbended surface of the part carriers, wherein the second first bend is on a side opposite of the first side of the longitudinal axis.

7. The method according to claim 6, comprising forming substantially a U-shape in the strip stock by modifying each of the first bends.

8. The method according to claim 7, comprising forming substantially an L-shape form the strip stock at a location different from the first location.

9. The method according to claim 8, comprising the steps of advancing the strip stock to a fourth position and creating an overbend in the L-shape of the strip stock.

10. The method according to claim 9, comprising the steps of advancing the strip stock to a fifth position and creating a radius bend at a distal end of the L-shape of the strip stock.

11. The method according to claim 1, comprising the step of separating the stamped metal laminate part from the first and second part carriers by advancing the strip stock through the progressive die and punching the stamped metal laminate part from the first and second part carriers.

12. The method as claimed in claim 1, wherein the advancing of the strip stock through the progressive die to the second position takes place subsequent to the step of advancing the strip stock through the progressive die to the first position; and the advancing of the strip stock through the progressive die to the at least third position takes place subsequent to the step of advancing the strip stock through the progressive die to the second position.

13. A laminated abutment clip made by the method of claim 1.

14. A laminated abutment clip made by the method of claim 11.

15. A method of forming a stamped metal laminate part from a strip stock having a generally C-shape, wherein a part carrier is provided on each side of the C-shape strip stock, wherein a longitudinal axis can be defined between the two part carriers and through the C-shape strip stock, wherein the strip stock comprises a layer of viscoelastic material laminated between two metal layers, the method comprising the steps of:

advancing the strip stock through a progressive die to a first position at which a first form is created in the strip stock at a first location spaced from the longitudinal axis;

thereafter, advancing the strip stock through the progressive die to a second position at which a second form is created in the strip stock by modifying the first form; and thereafter, advancing the strip stock through the progressive die to at least a third position at which a third form is created in the strip stock, wherein the second form is intermediate the longitudinal axis and the third form;

wherein the successive creation of the first form, second form and then the third form:

prevents the relative sliding of the metal layers in the strip stock between the longitudinal axis and the particular form being created during the formation of the successive forms, and permits the relative sliding of the metal layers in the strip stock at portions thereof further from the longitudinal axis than the particular form being created, thereby preventing delamination of the strip stock during the forming of the first, second and third forms.

16. A laminated abutment clip made by the method of claim 14.

17. A method of forming an abutment clip for an automotive braking assembly from a strip stock, wherein a part carrier is provided on each side of the strip stock, wherein a longitudinal axis can be defined between the two part carriers and through the strip stock, wherein the strip stock comprises a layer of viscoelastic material laminated between two metal layers, the method comprising the steps of:

advancing the strip stock through a progressive die to a first position at which a first form is created in the strip stock at a first location spaced from the longitudinal axis;

advancing the strip stock through the progressive die to a second position at which a second form is created in the strip stock by modifying the first form; and advancing the strip stock through the progressive die to at least a third position at which a third form is created in the strip stock, wherein the second form is intermediate the longitudinal axis and the third form;

wherein the successive creation of the first form, second form and then the third form:

prevents the relative sliding of the metal layers in the strip stock between the longitudinal axis and the particular form being created during the formation of the successive forms, and permits the relative sliding of the metal layers in the strip stock at portions thereof further from the longitudinal axis than the particular form being created, thereby preventing delamination of the strip stock during the forming of the first, second and third forms.

* * * * *